US006619605B2

(12) United States Patent
Lambert

(10) Patent No.: US 6,619,605 B2
(45) Date of Patent: Sep. 16, 2003

(54) MOUNTING ASSEMBLY FOR IN-CAR VIDEO STSTEMS

(76) Inventor: Graham Keith Lambert, 12 St. Martin's Rd., Caerphilly (GB)

( * ) Notice: Subject to any disclaimer, the term of this patent is extended or adjusted under 35 U.S.C. 154(b) by 0 days.

(21) Appl. No.: 09/760,870

(22) Filed: Jan. 16, 2001

(65) Prior Publication Data

US 2001/0008266 A1 Jul. 19, 2001

(51) Int. Cl.$^7$ ............................................. A47B 96/00
(52) U.S. Cl. ........................... 248/226.11; 248/228.8; 248/919; 297/188.05; 297/188.06; 224/275 224/929
(58) Field of Search ............................ 248/118, 229.17, 248/230.8, 220.21, 220.22, 176.1, 918, 917, 228.8, 200, 919, 205.2, 226.11; 224/275, 929; 297/188.01, 188.04, 188.05, 188.06, 391

(56) References Cited

U.S. PATENT DOCUMENTS

| 5,046,433 | A | * | 9/1991 | Kramer et al. ................. 108/44 |
| 5,207,471 | A | * | 5/1993 | Mutschler et al. ......... 296/37.12 |
| 5,226,576 | A | * | 7/1993 | Ellsworth .................... 224/572 |
| 5,383,588 | A | * | 1/1995 | Kazel .......................... 224/275 |
| 5,443,018 | A | * | 8/1995 | Cromwell .................... 108/44 |
| 5,678,741 | A | * | 10/1997 | Schieber ...................... 224/275 |
| 5,713,633 | A | | 2/1998 | Lu |
| 5,842,715 | A | | 12/1998 | Jones |
| 5,878,672 | A | * | 3/1999 | Ostermann et al. ........... 108/44 |
| 5,937,765 | A | * | 8/1999 | Stirling ........................ 108/43 |
| 5,984,347 | A | * | 11/1999 | Blanc-Rosset .............. 280/727 |
| 6,035,789 | A | * | 3/2000 | Ben-Haim .................... 108/43 |
| 6,097,448 | A | * | 8/2000 | Perkins ........................ 348/837 |
| 6,216,927 | B1 | * | 4/2001 | Meritt ......................... 224/275 |
| 6,237,267 | B1 | * | 5/2001 | Lackomar .................... 40/593 |

FOREIGN PATENT DOCUMENTS

| DE | 44 36 877 A1 | * | 12/1995 |
| DE | 199 43 696 A1 | * | 3/2001 |
| EP | 0 230 280 | | 7/1987 |
| EP | 0 897 733 A1 | * | 2/1999 |
| GB | 2239639 | | 7/1991 |
| WO | WO 00/07847 | | 2/2000 |

* cited by examiner

Primary Examiner—Korie Chan
(74) Attorney, Agent, or Firm—Edwin D. Schindler

(57) ABSTRACT

A mount 10 for detachably mounting a screen of an in-car video entertainment system to the rear of a headrest of a vehicle comprises fixings 15 for engagement by the rear of the video screen. The mount 10 enables the video screen to be secured firmly in position against the rear surface of the headrest, so that rear-seat passengers can view the video output from a computer games device, video cassette/tape recorder or video disc player etc. The mount may be fitted to any existing headrest without any modification to the headrest being required.

12 Claims, 3 Drawing Sheets

MOUNTING ASSEMBLY FOR IN-CAR VIDEO STSTEMS

BACKGROUND OF THE INVENTION

1. Field of the Invention

The present invention relates to in-car video systems and in particular to arrangements for mounting a video screen in a car, for viewing by the rear-seat passengers.

2. Related Background Art

An in-car video entertainment system has been developed which comprises an LCD video screen embedded permanently in the rear of the front-seat headrest, for viewing by the rear-seat passengers.

I have now devised arrangements enabling video screens to be fitted in position without modification of existing vehicle installations.

SUMMARY OF THE INVENTION

In accordance with the present invention, there is provided a mount for mounting a video screen in a vehicle, the mount being arranged for attaching to the headrest of a vehicle seat, such that at least a portion of the mount lies against the rear surface of the headrest, said portion of the mount comprising means for engagement by the rear of the video screen to secure the video screen against the rear surface of the headrest.

The mount in accordance with the present invention enables the video screen to be secured firmly in position against the rear surface of the headrest, so that rear-seat passengers can view the video output from a computer games device, video cassette/tape recorder or video disc player etc. The mount may be fitted to any existing headrest without any modification to the headrest being required. Preferably, the mount enables the video screen to be removed from the headrest, so that it can be stowed out of sight when the vehicle is left unattended. Moreover, the mount enables the in-car video system to be moved from car-to-car whenever desired.

In a preferred embodiment, the mount comprises a generally flat plate provided with the means for mounting engagement by the rear of the video screen, one or more straps being provided for tensioning around the headrest to attach the plate against the rear of the headrest.

In other embodiments, the mount may comprise a strap for passing around the headrest, either over the top and under the bottom of the headrest or around the opposite ends of the headrest, with the portion of the strap which lies against the rear surface of the headrest being provided with the means for mounting engagement by the rear of the video screen.

In a further embodiment, the mount may comprise a cover for fitting over the headrest, the cover being in the form of an envelope having an opening along e.g. its bottom edge, and including a rear portion or panel provided with the means for mounting engagement by the rear of the video screen.

In use, the video screen is mounted to the rear of the headrest and the video player is placed in any other desired location within the car or other vehicle. Preferably the video player and video screen are linked together by a single cable only, carrying both power and signals (audio and video) to the screen: typically, the power and signal ports are provided in one side edge of the screen and preferably the cable has a unitary terminal which attaches to the screen by engagement with these ports. Preferably an infra-red sensor is mounted at a front surface of the connector and is coupled, via the cable, to the video player, enabling remote control of the player by a rear-seat passenger using a hand-held infra red controller.

These and other objects, features and advantages of the present invention will be clearly understood through consideration of the following detailed description.

BRIEF DESCRIPTION OF THE DRAWINGS

Embodiments of the present invention will now be described by way of examples only and with reference to the accompanying drawings, in which.

DETAILED DESCRIPTION OF THE PREFERRED EMBODIMENTS

Figure 1:
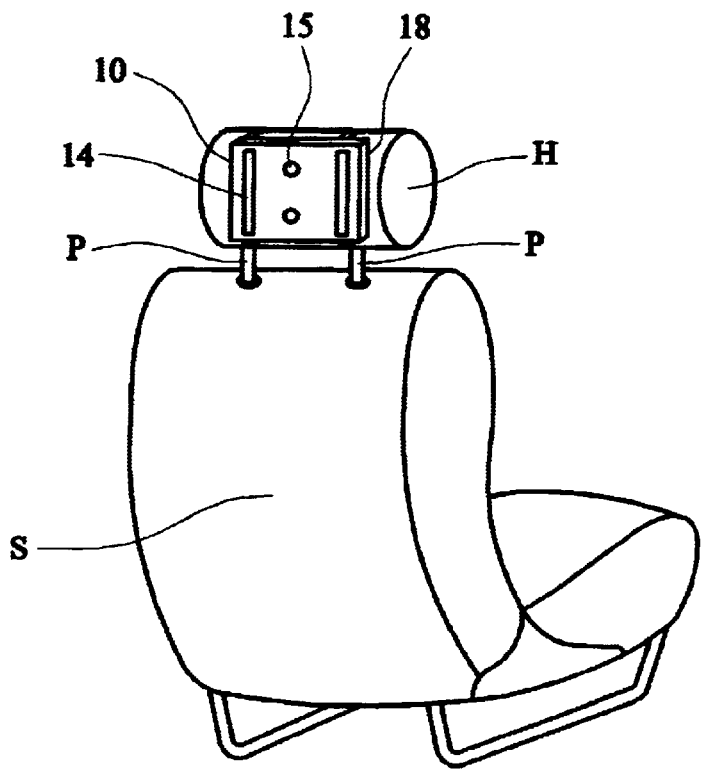
FIG. 1 is a view of a car seat with a first embodiment of screen mount attached to its headrest.

Referring to FIG. 1, there is shown a car seat S having a headrest H mounted to it by means of a pair of upright posts P, which project from the underside of the headrest, being received in respective sockets in the top edge of the back of the seat. A mount 10 is attached to the rear of the headrest H: the mount 10 is arranged for a flat, LCD video screen to be fitted to it to secure the screen against the rear surface of the headrest.

The mount 10 comprises a flat, rectangular plate formed, adjacent each of its ends, with a pair of elongate apertures 12 aligned parallel with its length. Two straps 14 are provided, and are threaded through the respective pairs of apertures 12 and passed around the top and bottom of the headrest: each strap is pulled tight around the headrest and its free ends are fastened together (e.g. by means of hook-and-loop (Velcro) fasteners) to secure the mount 10 firmly against the rear of the headrest. The front face of the mount 10 may be formed with a pair of vertically-spaced studs 15 (as shown in FIG. 1) to facilitate the mounting of the video screen: instead, it may be formed with a projecting T-section rib 16 (as shown in FIGS. 2 and 3), running parallel to the opposite ends of the mount mid-way between them; the rib 16 enables a video screen, having a corresponding T-section groove in its rear, to be slidably mounted onto the mount 10.

Figure 2:
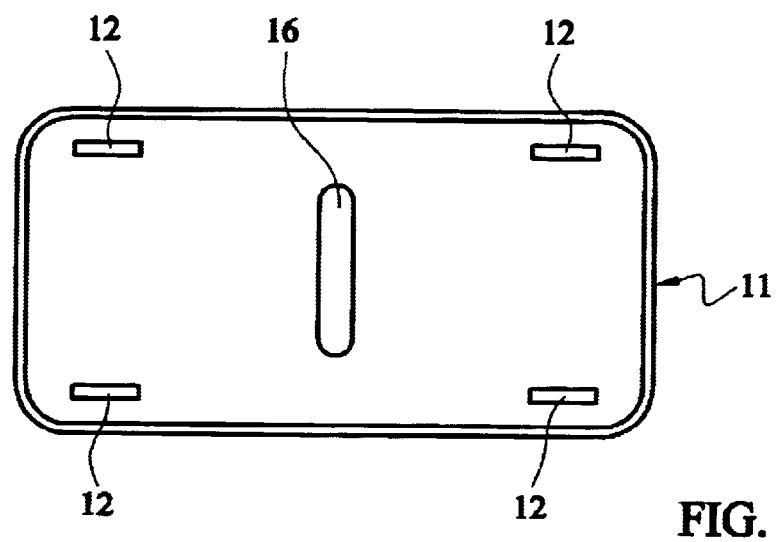
FIG. 2 is an enlarged front view of the screen mount shown in FIG. 1.
Figure 3:
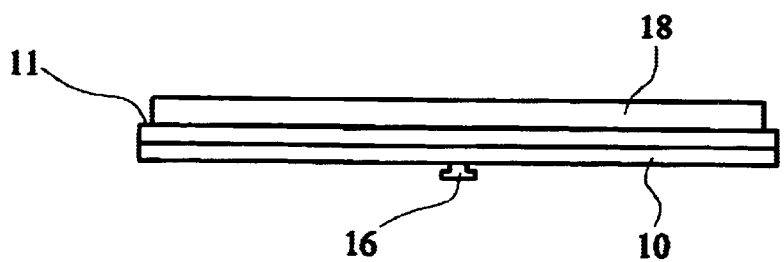
FIG. 3 is a top-edge view of the screen mount.

The mount 10 is formed of plastics material and is strengthened by a peripheral lip 11 on its rear surface, as shown in FIGS. 2 and 3. From FIG. 2, it will be appreciated that the mount is symmetrical about both vertical and horizontal medial lines, so can be attached either way up to the headrest.

In order to enable adjustment to the orientation of the screen, i.e. the direction in which it faces, a sheet 18 of foam plastics material is interposed between the mount 10 and the rear surface of the headrest. The two straps 14 may be tightened by different amounts, so that the sheet of foam plastics material is compressed to different degrees adjacent its opposite ends, so that the screen is directed to left or right as required. Alternatively, the piece of foam plastics material may comprise a packing strip which is positioned as required towards one end or towards the top or bottom of the mount 10.

Figure 4:
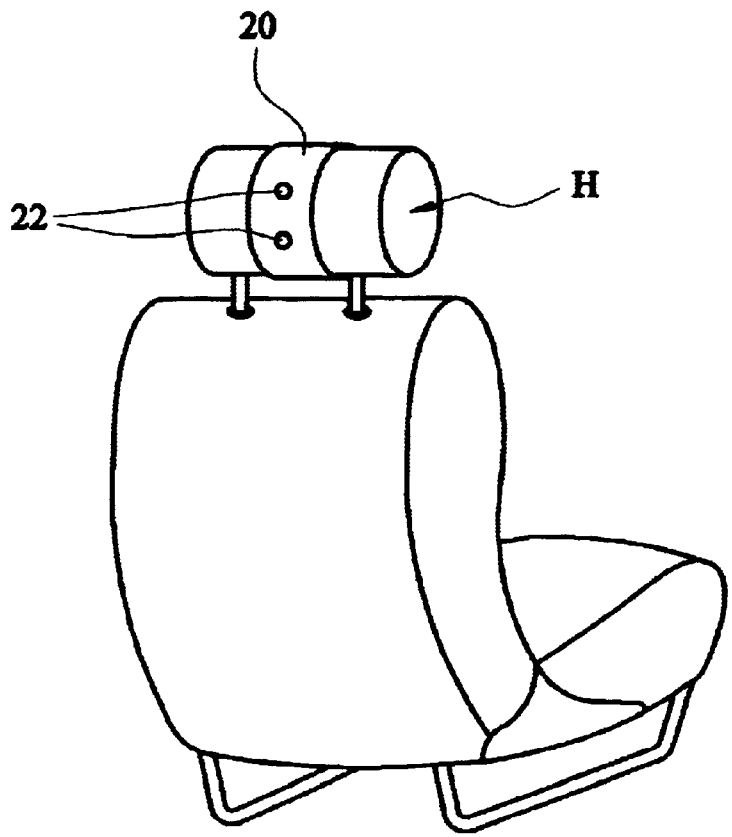
FIG. 4 is a view of a car seat with a second embodiment of screen mount attached to its headrest.

Referring to FIG. 4, there is shown a second embodiment of screen mount attached to the headrest H of the car seat. In this embodiment, the screen mount comprises a strap 20 the ends of which are passed over the top and under the bottom of the headrest, and fastened together, e.g. by means of hook-and-loop (Velcro) fasteners. The strap 20 is provided with two projecting studs 22, spaced apart along its length and therefore vertically when the strap is tied around the headrest, onto which the video screen may be mounted: the strap is tensioned sufficiently to hold the screen firmly in position. The strap 20 may be displaced around the headrest to direct the screen as required in the vertical plane: in order to deflect the screen to left or right, a packing strip may be interposed between the back of the screen and the rear of the headrest, towards the right or left end of the headrest.

Figure 5:
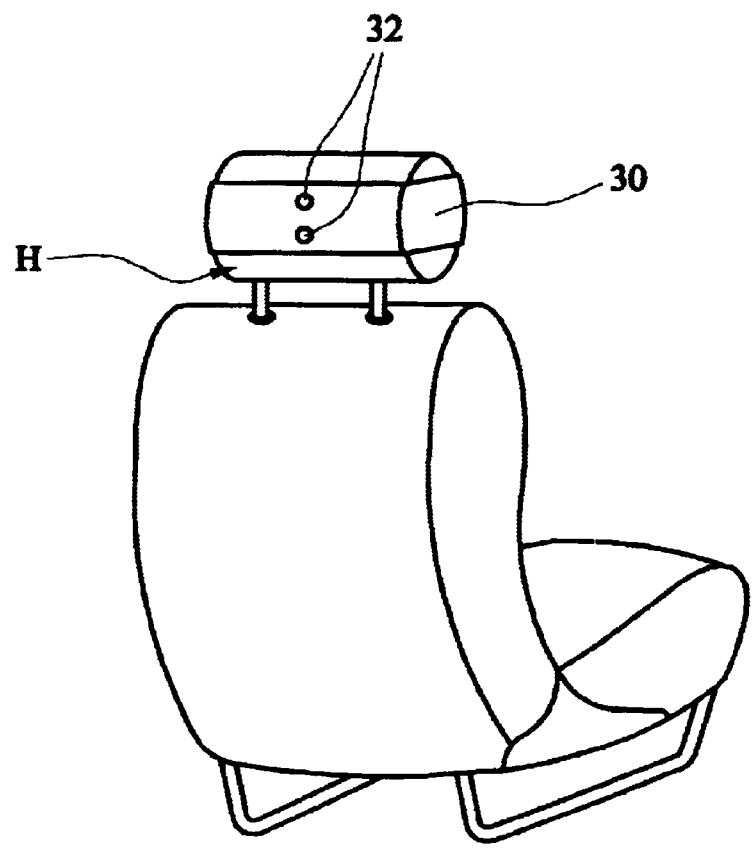
FIG. 5 is a view of a car seat with a third embodiment of screen mount attached to its headrest.

Referring to FIG. 5, there is shown a third embodiment of screen mount attached to the headrest H of the car seat. In this embodiment, the screen mount comprises a strap 30 the ends of which are passed around the opposite ends of the headrest and fastened together, e.g. by means of hook-and-loop (Velcro) fasteners. The strap 30 is provided with two projecting studs 32, spaced across its width and therefore vertically when the strap is tied around the headrest, onto which the video screen may be mounted. The strap 30 is tensioned sufficiently to hold the screen firmly in position. The strap 30 may be displaced around the headrest to direct the screen as required in the vertical plane: in order to deflect the screen to left or right, a packing strip may be used in the manner described for the embodiment of FIG. 4.

Figure 6:
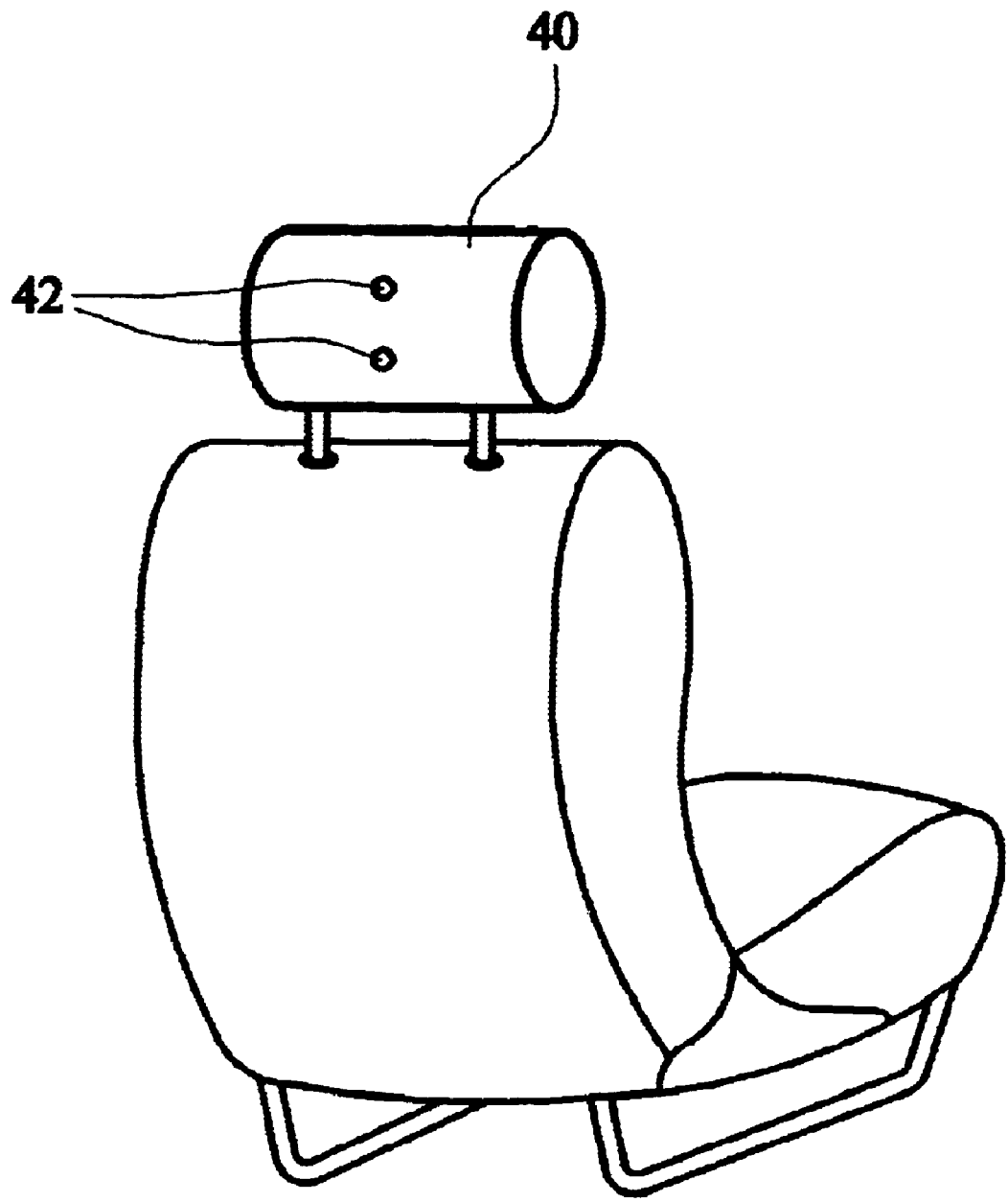
FIG. 6 is a view of a car seat with a fourth embodiment of screen mount attached to its headrest.

Referring to FIG. 6, there is shown a fourth embodiment of screen mount attached to the headrest H of the car seat. In this embodiment, the mount comprises an elasticated cover 40 in the form of an envelope, open along its bottom edge, which is fitted over the top of the headrest. Because of its elasticated nature, the cover 40 grips the headrest firmly to maintain its position on the headrest. The cover 40 is provided, in its rear side, with a pair of projecting studs 42, onto which the video screen may be mounted. The cover 40 may be displaced around the headrest to direct the screen as required in the vertical plane: a packing strip may be interposed between the screen and the headrest, as described for the embodiments of FIGS. 4 and 5, to deflect the screen to left or right.

It will be appreciated that, in each of the embodiments which have been described, the video screen may be attached to the mount either after the mount is secured to the headrest, or beforehand. Similarly, the video screen may be removed from the mount either before the mount is removed from the headrest, or afterwards.

Upon leaving the car unattended, the video screen will normally be detached and stored in a safe place: the mount may be left in position on the headrest, or it may be removed.

While the preferred embodiment of the invention have been shown and described, it will be apparent to those skilled in the art that changes and modifications may be made therein without departing from the spirit of the invention, the scope of which is defined by the appended claims.

I claim:

1. A vehicle, comprising:
    a vehicle seat;
    a headrest including a body portion with opposing front and rear faces, said headrest being attached to a top of said vehicle seat;
    a video screen; and,
    a mount with said video screen being mounted to said headrest by said mount, said mount comprising:
        a base plate having a front face and a rear face;
        a resiliently deformable member on said rear face of said base plate;
        means for adjustably attaching said base plate to said head rest; and,
        means for engaging and supporting said video screen on said front face of said base plate, said means for adjustably attaching including at least one strap having a length sufficient for embracing the headrest and being capable of being tensioned around the headrest when said base plate is attached thereto, so that said resiliently deformable member disposed between said rear face of said base plate and the rear face of the headrest is deformed for positioning said video screen at a desired viewing angle relative to said headrest.

2. The vehicle according to claim 1, wherein said resiliently deformable member includes a sheet of a foamed plastic material.

3. The vehicle according to claim 1, wherein said base plate includes a plurality of apertures through which said at least one strap is threaded.

4. The vehicle according to claim 3, wherein said base plate includes opposing top and bottom sides and opposing left and right sides, said base plate top and bottom sides being joined together by said base plate left and right sides, said plurality of apertures being disposed in said base plate proximate to junctures of said opposing top, bottom, left and right sides, with pairs of apertures of said plurality of apertures being aligned with each other.

5. The vehicle according to claim 4, wherein said plurality of apertures are disposed parallel to said opposing top and bottom sides of said base plate and on opposite sides of said means for engaging and supporting said video screen.

6. The vehicle according to claim 3, wherein said at least one strap passes through said plurality of apertures and around said headrest when said base plate is attached to said headrest.

7. The vehicle according to claim 4, wherein said base plate is rectangular.

8. The vehicle according to claim 7, further comprising a plurality of straps capable of being independently tensioned, so that said resiliently deformable member disposed between said rear face of said base plate and said front face of the head rest is deformed for positioning said video screen at the desired viewing angle relative to the headrest.

9. The vehicle according to claim 1, wherein said means for engaging and supporting said video screen includes an engagement member projecting from said base plate and extending vertically along said front face of said base plate.

10. The vehicle according to claim 1, wherein said base plate is rectangular.

11. A method for mounting a video screen to the headrest of a vehicle, said method comprising the steps of:
    providing a mount comprising a base plate having a front face and a rear face, a resiliently deformable member on the rear face of the base plate and a strap;
    positioning the mount against a rear surface of the headrest;
    passing the strap of the mount around the headrest;
    engaging the video screen with means for supporting the video screen on the front face of the base plate; and,
    tensioning the strap around the headrest for disposing the resiliently deformable member between the rear face of the base plate and the rear face of said headrest, the resiliently deformable member being deformed for positioning the video screen at a desired viewing angle relative to the headrest.

12. The method for mounting a video screen to the headrest of a vehicle according to claim 11, wherein said tensioning step is carried out by independently tensioning a plurality of straps around the headrest for disposing the resiliently deformable member between the rear of the base plate and the rear face of said headrest.

* * * * *